United States Patent
Laracey

(10) Patent No.: US 10,445,723 B2
(45) Date of Patent: Oct. 15, 2019

(54) NFC-TRANSACTION PROCESSING SYSTEMS AND METHODS

(71) Applicant: PAYPAL, INC., San Jose, CA (US)

(72) Inventor: Kevin Laracey, Natick, MA (US)

(73) Assignee: PayPal, Inc., San Jose, CA (US)

( * ) Notice: Subject to any disclaimer, the term of this patent is extended or adjusted under 35 U.S.C. 154(b) by 519 days.

(21) Appl. No.: 13/893,978

(22) Filed: May 14, 2013

(65) Prior Publication Data

US 2013/0311313 A1 Nov. 21, 2013
US 2016/0292667 A9 Oct. 6, 2016

Related U.S. Application Data

(63) Continuation-in-part of application No. 13/768,156, filed on Feb. 15, 2013, now Pat. No. 9,305,295, and a continuation-in-part of application No. 13/731,348, filed on Dec. 31, 2012, now Pat. No. 9,400,978, and a continuation-in-part of application No. 13/336,574, filed on Dec. 23, 2011, now Pat. No. 8,632,000, which is a continuation-in-part of application No. 12/846,911, filed on Jul. 30, 2010, now Pat. No. 8,380,177, said application No. 13/768,156 is a continuation of application No. 12/846,911, filed on Jul. 30, 2010, now Pat. No. 8,380,177, said application No. 13/731,348 is a continuation-in-part (Continued)

(51) Int. Cl.
*G06Q 20/32* (2012.01)
*G06Q 20/38* (2012.01)
*G06Q 20/40* (2012.01)

(52) U.S. Cl.
CPC ....... *G06Q 20/3278* (2013.01); *G06Q 20/327* (2013.01); *G06Q 20/3821* (2013.01); *G06Q 20/401* (2013.01)

(58) Field of Classification Search
CPC ............. G06Q 20/3278; G06Q 20/327; G06Q 20/3821; G06Q 20/401
See application file for complete search history.

(56) References Cited

U.S. PATENT DOCUMENTS

| 5,739,512 A | 4/1998 | Tognazzini |
| 7,040,533 B1 | 5/2006 | Ramachandran |
| 7,379,921 B1 | 5/2008 | Kiliccote |

(Continued)

FOREIGN PATENT DOCUMENTS

| EP | 1 264 259 B1 | 2/2007 |
| JP | 2002-032686 A | 1/2002 |

(Continued)

OTHER PUBLICATIONS

Francis, Lishoy, et al. "Potential misuse of NFC enabled mobile phones with embedded security elements as contactless attack platforms." 2009 International Conference for Internet Technology and Secured Transactions,(ICITST). IEEE, 2009.*

(Continued)

*Primary Examiner* — Asfand M Sheikh
(74) *Attorney, Agent, or Firm* — Haynes and Boone LLP

(57) ABSTRACT

Embodiments of the present invention relate to systems, methods, processes, computer program code, and means for employing the near field communication ("NFC") functionality of mobile devices for use in payment transactions.

20 Claims, 3 Drawing Sheets

Related U.S. Application Data of application No. 12/846,911, filed on Jul. 30, 2010, now Pat. No. 8,380,177.

(60) Provisional application No. 61/651,177, filed on May 24, 2012, provisional application No. 61/646,523, filed on May 14, 2012, provisional application No. 61/582,010, filed on Dec. 30, 2011, provisional application No. 61/426,731, filed on Dec. 23, 2010, provisional application No. 61/362,567, filed on Jul. 8, 2010, provisional application No. 61/322,477, filed on Apr. 9, 2010.

(56) References Cited

U.S. PATENT DOCUMENTS

| | | | |
|---|---|---|---|
| 7,483,858 | B2 | 1/2009 | Foran et al. |
| 7,992,776 | B1 | 8/2011 | Ramachandran et al. |
| 9,741,028 | B2* | 8/2017 | Webb .................... G06Q 20/32 |
| 10,242,368 | B1* | 3/2019 | Poole .................. G06Q 20/425 |
| 2003/0004737 | A1 | 1/2003 | Conquest et al. |
| 2003/0110717 | A1 | 6/2003 | Rodriguez |
| 2004/0044621 | A1* | 3/2004 | Huang .................... G06Q 20/02 705/40 |
| 2005/0203854 | A1 | 9/2005 | Das et al. |
| 2005/0222961 | A1* | 10/2005 | Staib .................... G06Q 20/327 705/64 |
| 2006/0105742 | A1 | 5/2006 | Kim et al. |
| 2006/0206709 | A1 | 9/2006 | Labrou et al. |
| 2007/0255620 | A1* | 11/2007 | Tumminaro ........... G06Q 20/10 705/14.27 |
| 2007/0278290 | A1* | 12/2007 | Messerges ............ G06Q 20/10 235/380 |
| 2007/0295805 | A1 | 12/2007 | Ramachandran |
| 2008/0034221 | A1 | 2/2008 | Hammad et al. |
| 2008/0048022 | A1 | 2/2008 | Vawter |
| 2008/0155258 | A1* | 6/2008 | Obereiner ............ H04L 9/0844 713/168 |
| 2008/0222048 | A1 | 9/2008 | Higgins et al. |
| 2008/0252415 | A1* | 10/2008 | Larson ............... G07C 9/00309 340/5.73 |
| 2009/0066509 | A1* | 3/2009 | Jernstrom ............ G06K 7/0004 340/568.1 |
| 2009/0111378 | A1* | 4/2009 | Sheynman ............ H04W 8/005 455/41.1 |
| 2009/0144550 | A1* | 6/2009 | Arunan ................. H04L 63/068 713/171 |
| 2009/0153327 | A1* | 6/2009 | Hartwig .............. H04M 1/7253 340/572.1 |
| 2009/0254479 | A1 | 10/2009 | Pharris |
| 2009/0307140 | A1* | 12/2009 | Mardikar ........... G06Q 20/1085 705/71 |
| 2009/0325484 | A1* | 12/2009 | Lele ..................... H04W 8/205 455/41.1 |
| 2010/0017327 | A1 | 1/2010 | Treadwell et al. |
| 2010/0082485 | A1* | 4/2010 | Lin ........................ G06Q 20/12 705/44 |
| 2010/0090810 | A1* | 4/2010 | Gallo .................... G06Q 20/04 340/10.51 |
| 2010/0125510 | A1 | 5/2010 | Smith et al. |
| 2011/0055084 | A1 | 3/2011 | Singh |
| 2011/0066550 | A1 | 3/2011 | Shank et al. |
| 2011/0238573 | A1 | 9/2011 | Varadarajan |
| 2011/0251892 | A1 | 10/2011 | Laracey |
| 2012/0187187 | A1 | 7/2012 | Duff et al. |
| 2013/0080276 | A1* | 3/2013 | Granbery ............... G06Q 20/20 705/21 |
| 2013/0110654 | A1 | 5/2013 | Kobres |
| 2013/0110676 | A1 | 5/2013 | Kobres |
| 2013/0110727 | A1 | 5/2013 | Kobres |
| 2013/0110728 | A1 | 5/2013 | Kobres |
| 2013/0124411 | A1 | 5/2013 | Kobres et al. |
| 2013/0132234 | A1 | 5/2013 | Grossi et al. |
| 2013/0173474 | A1* | 7/2013 | Ranganathan et al. ......... 705/67 |

FOREIGN PATENT DOCUMENTS

| | | | |
|---|---|---|---|
| JP | 2002109421 | A | 4/2002 |
| JP | 2003-141402 | A | 5/2003 |
| JP | 2004-246536 | A | 9/2004 |
| JP | 2004-326348 | A | 11/2004 |
| JP | 2005-157426 | A | 6/2005 |
| JP | 2005276023 | A | 10/2005 |
| JP | 2006-099713 | A | 4/2006 |
| JP | 2006-243842 | A | 9/2006 |
| JP | 2006-277715 | A | 10/2006 |
| JP | 2007-034941 | A | 2/2007 |
| JP | 2007299316 | A | 11/2007 |
| JP | 2008-129787 | A | 6/2008 |
| JP | 2008-217277 | A | 9/2008 |
| JP | 2008-242828 | A | 10/2008 |
| JP | 2009-080729 | A | 4/2009 |
| JP | 2009-276838 | A | 11/2009 |
| JP | 2012046694 | | 8/2012 |
| KR | 2006-0084520 | A | 7/2006 |
| KR | 1020100018744 | A | 2/2010 |
| KR | 20110039946 | A | 4/2011 |
| WO | 01/63546 | A1 | 8/2001 |
| WO | 2008-153096 | A1 | 12/2008 |
| WO | 2010035224 | A2 | 4/2010 |
| WO | 2010125577 | A1 | 11/2010 |
| WO | WO 2011/153281 | | 12/2011 |

OTHER PUBLICATIONS

"PCT Notification of Transmittal of the International Search Report and the Written Opinion of the International Searching Authority, or the Declaration", dated Sep. 13, 2013, for International Application No. PCT/US2013/040953, 13pgs.

"European Communication Extended European Search Report", European Patent Office, dated Mar. 27, 2014, for European Application No. 11766781.6-1955 / 2556477, International Application No. PCT/US2011/031696, 7pgs.

"Notification Concerning Transmittal of International Preliminary Report on Patentability, Chapter I of the Patent Cooperation Treaty", dated Nov. 27, 2014, for International Application No. PCT/US2013/040953, 10pgs.

"Japanese Office Action", dated Aug. 21, 2014, for Japanese Patent Application No. 2013-503978, entitled: Mobile Phone Payment Processing Methods and Systems, 3pgs.

"English-language Translation of Japanese Office Action", dated Aug. 21, 2014, for Japanese Patent Application No. 2013-503978, entitled: Mobile Phone Payment Processing Methods and Systems, 5pgs.

"Notification Concerning Transmittal of International Preliminary Report on Patentability, Chapter I of the Patent Cooperation Treaty", dated Dec. 4, 2014, for International Application No. PCT/US2013/042714, 7pgs.

"Examiner's Report", dated Sep. 8, 2014, Canadian Intellectual Property Office, for Canadian Patent Application No. 2,819,696, entitled: Mobile Phone Payment Processing Methods and Systems, 4pgs.

"PCT Notification of Transmittal of the International Search Report and the Written Opinion of the International Searching Authority, or the Declaration", dated Dec. 7, 2011, for International Application No. PCT/US2011/031696, 11pgs.

"PCT Notification of Transmittal of the International Search Report and the Written Opinion of the International Searching Authority or the Declaration", dated Aug. 14, 2012, for PCT Application No. PCT/US2011/067197, 16pgs.

"PCT Notification of Transmittal of the International Search Report and the Written Opinion of the International Searching Authority, or the Declaration", dated Sep. 13, 2013, for International Application No. PCT/US2013/042714, 10pgs.

"Japanese Office Action", dated Dec. 9, 2013, for Japanese Application No. 2013-503978, 8pgs.

"European Communication pursuant to Rule 114(2) EPC", European Patent Office, dated Oct. 30, 2013, European Application No. 11766781.6-1955 / 2556477, International Application No. PCT/US2011/031696, 8pgs.

(56) References Cited

OTHER PUBLICATIONS

News Releases in 2006, "Bill Paying by Mobile Phone Using Barcode Capture", Nov. 8, 2006, NTT Data Corporation, 4pgs.
Laracey, Kevin "Japanese Office Action", dated Jul. 29, 2014, for Japanese Patent Application No. 2013-546454, entitled: Mobile Phone ATM Processing Methods and Systems, 5pgs.
Laracey, Kevin "English-language Translation of Japanese Office Action", dated Jul. 29, 2014, for Japanese Patent Application No. 2013-546454, entitled: Mobile Phone ATM Processing Methods and Systems, 6pgs.
Communication: "The Extended European Search Report", dated Jun. 3, 2014, European Patent Office, for European Application No. 11851732.5-1958 / 2656292 PCT/US2011/067197, 6pgs.
Japan Patent Office, "Office Action—Notice of Reason for Rejection", for Application No. 2015-512757, dated Mar. 20, 2018, 4 pages.
European Patent Office, "Examination Report", for Application No. 13 791 465.1-1217, dated May 8, 2018, 6 pages.

\* cited by examiner

NFC-TRANSACTION PROCESSING SYSTEMS AND METHODS

CROSS REFERENCE TO RELATED APPLICATIONS

The present application claims the benefit of U.S. Provisional Application No. 61/646,523, filed May 14, 2012. The present application is a continuation-in-part of U.S. patent application Ser. No. 13/768,156, filed Feb. 15, 2013, which is a continuation of U.S. patent application Ser. No. 12/846,911, filed Jul. 30, 2010, now U.S. Pat. No. 8,380,177, issued Feb. 19, 2013, which claims the benefit of U.S. Provisional Application No. 61/362,567, filed Jul. 8, 2010, and U.S. Provisional Application No. 61/322,477, filed Apr. 9, 2010. The present application is a continuation-in-part of U.S. patent application Ser. No. 13/731,348, filed Dec. 31, 2012, which claims the benefit of U.S. Provisional Application No. 61/651,177, filed May 24, 2012, and U.S. Provisional Application No. 61/582,010, filed Dec. 30, 2011. U.S. patent application Ser. No. 13/731,348, filed Dec. 31, 2012, is a continuation-in-part of U.S. patent application Ser. No. 12/846,911, filed Jul. 30, 2010, now U.S. Pat. No. 8,380,177, issued Feb. 19, 2013, which claims the benefit of U.S. Provisional Application No. 61/362,567, filed Jul. 8, 2010, and U.S. Provisional Application No. 61/322,477, filed Apr. 9, 2010. The present application is a continuation-in-part of U.S. patent application Ser. No. 13/336,574, filed Dec. 23, 2011, now U.S. Pat. No. 8,632,000, issued Jan. 21, 2014, which claims the benefit of U.S. Provisional Application No. 61/426,731, filed Dec. 23, 2010. U.S. patent application Ser. No. 13/336,574, filed Dec. 23, 2011, now U.S. Pat. No. 8,632,000, issued Jan. 21, 2014, is a continuation-in-part of U.S. patent application Ser. No. 12/846,911, filed Jul. 30, 2010, now U.S. Pat. No. 8,380,177, issued Feb. 19, 2013, which claims the benefit of U.S. Provisional Application No. 61/362,567, filed Jul. 8, 2010, and U.S. Provisional Application No. 61/322,477, filed Apr. 9, 2010. U.S. Provisional Application No. 61/646,523, filed May 14, 2012, U.S. patent application Ser. No. 13/768,156, filed Feb. 15, 2013, U.S. patent application Ser. No. 13/731,348, filed Dec. 31, 2012, U.S. patent application Ser. No. 12/846,911, filed Jul. 30, 2010, now U.S. Pat. No. 8,380,177, issued Feb. 19, 2013, and U.S. patent application Ser. No. 13/336,574, filed Dec. 23, 2011, now U.S. Pat. No. 8,632,000, issued Jan. 21, 2014, are all hereby incorporated by reference in their entirety for all purposes.

BACKGROUND

Increasingly, mobile devices such as smart phones now include near field communication ("NFC") technologies allowing the mobile device to use NFC to communicate with readers, tags and other NFC devices. NFC devices generally are able to operate in three modes of operation—"reader/writer", "peer-to-peer", and "card emulation" modes. The different operating modes are based on the ISO/IEC 18092, 14443, and NFC IP-1 standards.

In reader/writer mode, the NFC device is capable of reading NFC Forum-mandated tag types, such as in the scenario of reading an NFC Smart Poster tag. The reader/writer mode on the RF interface is compliant with the ISO/IEC 14443 and FeliCa schemes. In peer-to-peer mode, two NFC devices can exchange data (e.g., two devices can share Bluetooth or WiFi link set up parameters, or exchange virtual business cards or digital photos). Peer-to-peer mode is based on the ISO/IEC 18092 standard. In card emulation mode, an NFC device appears to an external reader much the same as a traditional contactless smart card. Card emulation mode enables contactless payments and ticketing by NFC devices without changes to the existing payment processing infrastructure. Currently, a number of smart phones include NFC technology.

Many mobile payment schemes propose to use the NFC devices in "card emulation mode". This mode allows the phone to serve as a repository of securely encrypted payment card credentials. Unfortunately, however, such usage requires that the payment card credentials be encrypted according to standards (or "schemes") controlled by the payment card associations (such as Visa, American Express, etc.), and furthermore require that a secure encrypted chip called a "secure element" be present on the mobile device, adding cost and complexity to mobile devices. These encryption schemes are closed and proprietary and licensing is at the discretion of the owner of the scheme. The licensing can be expensive, and approval to participate is not guaranteed.

Further, the application processing required to implement the encryption schemes can be complicated. For example, one standard, referred to as "Globoplatform/JCOP" (which is essentially a Java runtime environment implemented on an NFC chip) requires that each payment card stored on the chip have its own Java application that manages the encryption and decryption of that card's data using a unique set of keys.

The complexity and security considerations associated with managing different proprietary key schemes have resulted in the creation of a new entity in the NFC payments ecosystem called a Trusted Service Manager. The TSM has the job of serving as a trusted intermediary charged with managing the movement of encrypted payment card credentials using multiple encryption schemes to consumers' handsets. The TSM exists since the different associations have different schemes, and the associations do not want to share their specific encryption and card management schemes with one another, among other considerations. It is estimated that use of a TSM can add as much as $5 per year in cost to having a payment card stored and managed on a consumers' smartphone using card emulation mode NFC.

The use of encrypted card emulation mode NFC to facilitate payments has also created the opportunity for handset makers, and wireless carriers to attempt to control the process of placing payment cards on devices equipped with NFC card emulation mode capable chips. Wireless carriers such as Verizon and ATT working together as part of the Isis Consortium, and handset makers such as Google are attempting to charge significant fees to payment card issuers either in the form of licensing fees or co-marketing dollars, something that is not appealing to banks, who are the primary issuers of payment cards. Industry experts believe that Isis is proposing that banks pay nearly $10 per payment card per year to make a payment card available in an NFC enabled mobile phone from ATT or Verizon.

It would be desirable to provide methods and systems for employing NFC features of mobile devices for use in payment transactions that solve these and other problems, including offer delivery and redemption, and the delivery and redemption of loyalty points and awards. Other advantages and features will become apparent upon reading the following disclosure.

DESCRIPTION

Figure 1:
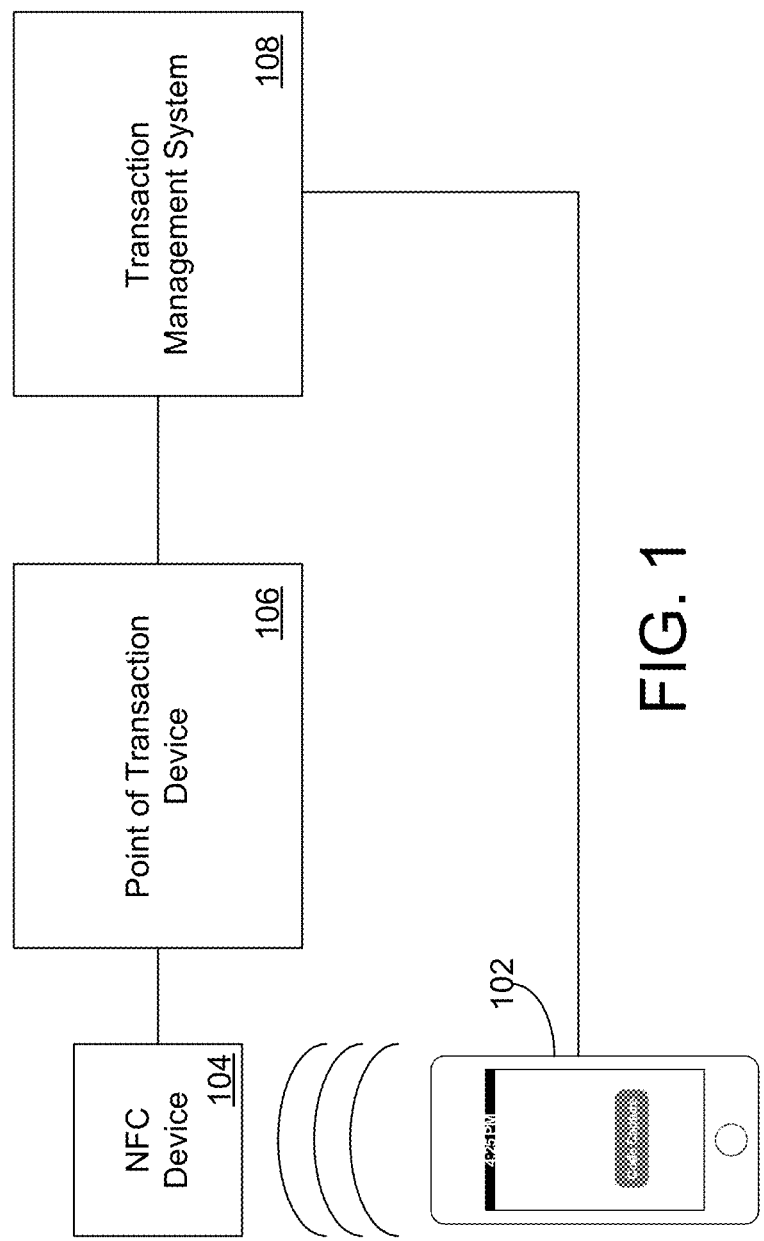
FIG. 1 is a block diagram depicting a system configured pursuant to some embodiments.

Embodiments of the present invention relate to systems, methods, processes, computer program code, and means for employing the near field communication ("NFC") functionality of mobile devices for use in payment transactions. In general, embodiments may be deployed in conjunction with a system such as that described by the inventors in their co-pending and commonly assigned applications referenced above in which mobile devices may be used to conduct transactions by scanning, capturing, or otherwise entering a code associated with a transaction. Features of some embodiments will be described in conjunction with a payment or other transaction system in which a mobile device is used to conduct a transaction at a merchant location (or, in some embodiments, at an automated teller machine, a kiosk, in a person to person transaction, or the like). Further, embodiments may be used in conjunction with payment or other transaction systems in which a mobile device is used to initiate a transaction by generating or otherwise obtaining a checkout token or other code and providing the checkout token or code to a second device involved in the transaction (such as a merchant point of sale device, an automated teller machine, a kiosk, a device of another individual, or the like) using NFC technologies.

Features of the present invention will be described assuming the use of the payment and transaction systems described in our co-pending applications referenced above, and the details of those systems will not be fully reiterated herein. However, embodiments of the present invention are not limited to use in conjunction with the payment or transaction systems described in our co-pending applications. Instead, the use of NFC functionality as described herein may be used with desirable results and benefits in a wide variety of payment or transaction systems, digital wallets, or the like. Further, while embodiments are described herein generally in reference to transactions (such as payment transactions), embodiments may be used with desirable results in other types of transactions such as loyalty, reward or other offer type of transactions where one device (such as a mobile) may interact with another device (such as another mobile device or a point of transaction).

Features of some embodiments of the present invention will now be described by reference to FIG. 1, which is a block diagram of a system 100 pursuant to some embodiments. Further details of the system 100 may be obtained by reference to our co-pending applications incorporated by reference herein. As shown, a payment account holder, buyer, or other user or operator (hereafter, the "customer") may have or use a mobile device 102 (such as a mobile telephone or the like). The mobile device 102 has a display screen and a data entry device (such as a keypad or touch screen). Pursuant to embodiments of the present invention, the customer may use the mobile device 102 to conduct a transaction with a merchant or other entity (such as a bank) via a point of transaction device 106. The point of transaction device 106 may be, for example, a point of sale terminal, an automated teller machine, another mobile device (e.g., such as a portable point of sale terminal, another individual's mobile device, etc.), or the like. The merchant may be a physical storefront, electronic commerce merchant, or mail order and telephone ("MOTO") merchant, or another person or entity. Further, the merchant need not be a "merchant", but may also be another individual (in the case of person to person transactions), or a kiosk or other unattended device (such as an automated teller machine ("ATM") or the like.

For convenience, and ease of exposition, the device associated with a customer, consumer, or other entity acting as a purchaser in a transaction will be referred to herein as the "mobile device 102" or "NFC enabled mobile device 102". The device associated with a merchant, vendor, funds recipient, or other entity acting as a seller or funds recipient in a transaction will be referred to as the "point of transaction device 106". Those skilled in the art, upon reading this disclosure, will appreciate that the point of transaction device 106 may be a traditional merchant point of sale device adapted to operate pursuant to the present invention, or it may be a device such as a mobile telephone or other device (e.g., in some embodiments, a customer may operate a mobile device and the merchant or other participant in a transaction may also operate a mobile device).

Pursuant to some embodiments, the mobile device 102 is an NFC-enabled mobile device such as a mobile telephone having a radio frequency identification ("RFID") chip installed therein (either as a part of the mobile telephone's chip set, or installed as an after-market SIM card). As a specific example, the mobile telephone may be a Google® Nexus S, or a Blackberry® 9600 smartphone each of which have RFID chips installed therein. Pursuant to some embodiments, the mobile device 102 may be operated pursuant to one or more standards, such as, for example, the ISO/IEC 18092, NFC IP-1 and ISO/IEC 14443 contactless communication standards or the like.

More particularly, pursuant to some embodiments, the mobile device 102 may be operated in the so-called "reader/writer" mode in which the NFC device in the mobile device 102 is capable of reading data from NFC Forum compatible NFC tags (such as an NFC tag in the NFC device 104). In some embodiments, the mobile device 102 may further (or alternatively) be capable of operating in the so-called "peer-to-peer" mode of operation. For convenience and ease of exposition, a mobile device which has an NFC device and that is capable of operating in an NFC mode of operation (such as in reader/writer mode and/or peer-to-peer mode, for example) will be referred to herein as an NFC enabled mobile device 102. The operation of the NFC device in the NFC enabled mobile device 102 may be controlled (at least for the purposes of transactions conducted pursuant to the present invention) via a mobile payment application installed on the NFC enabled mobile device 102. For example, operation of the mobile payment application may cause the NFC enabled mobile device 102 to activate or enable an NFC mode of operation of the NFC enabled mobile device, allowing the mobile device 102 to read data from an NFC device 104 associated with a point of transaction. The data read from the NFC device 104 (or, in an embodiment discussed further below in conjunction with FIG. 3, the data written to the NFC device 104) is captured by the mobile payment application and used in conjunction with payment or other transactions pursuant to the present invention.

As described in the co-pending applications, a purchase or other transaction process pursuant to some embodiments include the generation, scanning or capturing of a unique code (referred to herein as a "checkout token") associated with the point of transaction. Pursuant to the embodiment depicted in FIG. 1, the checkout token associated with the point of transaction is read by an NFC device in the NFC enabled mobile device 102 from an NFC device 104 associated with the point of transaction 106. As described in the co-pending applications, in some embodiments, the checkout token may be dynamically generated for use in individual transactions at specific merchants or locations. As used herein, such a dynamically generated checkout token is referred to as a "dynamic token" or "dynamic checkout token". A dynamic checkout token may be a token that is generated based on one or more items of information such as, for example, information associated with the specific point of transaction (such as a terminal identifier and/or a merchant identifier), information associated with a date and time of the transaction, and/or information associated with the transaction amount or other transaction details.

The checkout token may also be a static checkout token associated with a specific point of transaction 106. For example, a specific identifier may be assigned to an individual point of transaction.

In some embodiments, the reading of the checkout token (whether it be a static token or a dynamic token) by the NFC enabled mobile device 102 causes information to be transmitted from the NFC enabled mobile device 102 to a transaction management system 108 for use in completing a transaction. Pursuant to some embodiments, data associated with the checkout token may be used in conjunction with identifying or selecting an appropriate payment account for the transaction, for associating the NFC enabled mobile device 102 (and its holder) with a transaction, or for otherwise obtaining information about a pending transaction with a point of transaction 106.

In the embodiment depicted in FIG. 1, the NFC device 104 is in communication with the point of transaction device 106 via a communication interface 110 which allows the point of transaction device 106 to operate to either (1) update an NFC tag (or a device that emulates one of the many varieties of NFC tags) located in the NFC device 104, or (2) read information from an NFC tag (or a device that emulates an NFC tag) received from an NFC enabled mobile phone 102. For example, the communication interface 110 may be a wired interface (such as, for example, a serial interface or the like) or a wireless interface (such as a Bluetooth, ZigBee, or the like). Pursuant to some embodiments, the NFC device 104 may include an NFC tag encoded in the NFC Data Exchange Format ("NDEF") such as, for example, an NFC Forum Type 1-Type 4 tag pursuant to ISO/IEC 14443A, FeliCa, or ISO/IEC 14443.

The data transmitted to the NFC device 104 may include data that is formatted pursuant to a data exchange format such as the NFC Forum Data Exchange Format ("NDEF"). For example, the point of transaction device 106 may be provided with code allowing data (such as a static or dynamic checkout token) to be transmitted to the NFC device 104 in a format that allows the NFC device 104 to operate on the data such that the data (such as a static or dynamic checkout token) is stored in a memory of the NFC device 104 and accessible to be read by an NFC device such as an NFC enabled mobile device 102.

In some embodiments, for example, the point of transaction device 106 may be provided with an application that encapsulates checkout tokens generated by (or otherwise accessible to) the point of transaction device 106. The checkout tokens may be encapsulated into a single NDEF message or a group of NDEF messages that allow the checkout token data to be provided to the NFC device 104 for writing into an NFC tag of the NFC device 104. Pursuant to some embodiments, the point of transaction 106 may generate an NDEF message each time a checkout token is generated or identified. That is, in some embodiments, each time a checkout token is generated or identified, the point of transaction 106 is operated to cause the checkout token to be written to or stored in an NFC tag of the NFC device 104. The checkout token data may then be communicated to an NFC enabled mobile device such as device 102 for use in a transaction pursuant to the present invention. For example, when the NFC enabled mobile device 102 receives a checkout token, a message parser (such as an NDEF message parser) may be operated to deconstruct the message and hand the payload (containing the checkout token) to an application for processing. Pursuant to the present invention, the checkout token is passed to a mobile payment application for further processing (which may include, for example, transmitting the checkout token and other data to a transaction management system 108 to allow the transaction management system 108 to associate the mobile device 102 with a transaction involving the point of transaction 106).

In some embodiments, the checkout token may be generated (or otherwise identified) and transmitted (in a message such as an NDEF message) to NFC device 104 on a per-transaction basis. For example, in some embodiments, the NDEF message encapsulating a checkout token may be triggered or prompted by a cashier initiating a transaction at the point of transaction. As another example, the NDEF message encapsulating the checkout token may be triggered or prompted by a customer (or holder of an NFC enabled mobile device 102) instructing a point of transaction 106 that the customer wishes to conduct a transaction using a mobile device.

In some embodiments, the checkout token may be generated (or otherwise identified) and transmitted (in a message such as an NDEF message) to NFC device 104 on a less frequent basis. For example, in some embodiments, a static checkout token may be generated (or otherwise identified) to uniquely identify a particular point of transaction. Such a static checkout token need not be generated for each transaction; instead, the token may be generated or identified as needed to ensure the token uniquely identifies the point of transaction. In such embodiments, the point of transaction 106 may encapsulate the static checkout token data and transmit it (in a message such as an NDEF message) to NFC device 104 as needed.

The data encapsulated in the NDEF (or other) message may include a message type identifier (which may be, for example, an NDEF-specified type, or a custom message type). Further, the message may include other information useful to an NFC device for reading and acting on the data.

In some embodiments, the NFC tag in the NFC device 104 is written such that it is available to be read by an NFC enabled mobile device 102 operating in read/writer mode or in peer-to-peer mode. An example transaction involving the embodiment of FIG. 1 will now be described by reference to FIG. 2.

Figure 2:
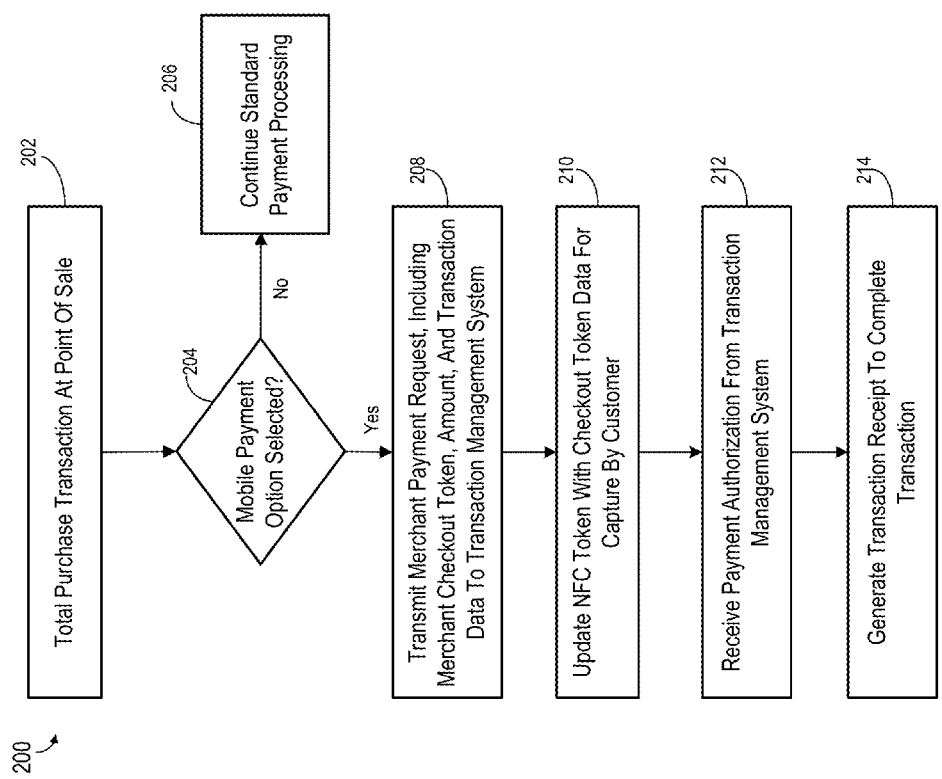
FIG. 2 is a flow diagram depicting a process pursuant to some embodiments.

The process of FIG. 2 is generally presented from the perspective of a merchant or other point of transaction. For example, transaction process 200 may be performed by or at a merchant location that has a point of transaction device 106 having an NFC device 104. Processing begins at 202 where the goods or services are rung up to total the purchase. Processing continues at 204 where the point of transaction device 106 (or the clerk) prompts the customer to select a payment option, and a determination is made whether a mobile payment option is selected. If the mobile payment option is not selected, processing continues at 206 where standard payment processing or processing to complete the purchase using another payment option occurs.

If the mobile payment option is selected, processing continues at 208 where the point of transaction device 106 (or other associated merchant systems) generates or otherwise obtains a checkout token. For example, the point of transaction device 106 may be operated to generate or assign a static or a dynamic checkout token for use in conjunction with the transaction. In one illustrative but not limiting example, the point of transaction device 106 may create and transmit a merchant payment authorization request, including a merchant checkout token, a transaction amount, and other transaction data (such as a terminal identifier, date, time, enhanced transaction data, etc.) to a transaction management system 108. The merchant payment authorization request is then used by the transaction management system 108 (as described, for example, in our co-pending applications), to create a pending transaction in a merchant transaction queue. In some embodiments, as discussed in our co-pending applications, the checkout token is not sent from the point of transaction device 106. Instead, the checkout token may be retrieved, generated or "looked up" by the transaction management system 108 in response to a message received at 208 from the point of transaction 106. For example, the checkout token may be looked up from a table associating a merchant ID (received at 208) with a static checkout token. In some embodiments, the checkout token could be generated by the transaction management system 108 when it receives the merchant payment authorization request at 208, and then the checkout token would be passed back to the point of transaction 106 as part of the acknowledgement of the merchant payment authorization request. Although processing at 208 is shown as including a checkout token transmitted from the merchant to the transaction management system 108, in some embodiments, the token is not sent at 208, instead, the checkout token is provided by the transaction management system 108.

Processing continues at 210 where a checkout token may be made available to the customer via the NFC device 104 so that the customer may capture the checkout token using an NFC reader in the mobile device 102. Processing at 210 may include the operation of the point of transaction device 106 to encapsulate the checkout token into a message (such as an NDEF message or messages) for provision to the NFC device 104 (e.g., to cause the NFC device to be updated with data associated with the checkout token). The customer may then, for example, be instructed by a clerk (or by signage associated with the NFC device 104) to tap or present their NFC enabled mobile device 102 to a touch point or area on the NFC device 104 within range of the NFC reader. A mobile payment application installed on the mobile device 102 may provide a confirmation signal or message that confirms when the data from the NFC device has successfully been read.

Once the checkout token has successfully been read by the mobile device 102, a message containing the checkout token is transmitted from the mobile device 102 to the transaction management system 108 for use in matching the payment details with the customer's payment information as described in our co-pending applications. Processing at the point of transaction continues at 212 where the point of transaction device 106 receives a merchant payment authorization response message from the transaction management system 108 (either directly or indirectly via intermediate systems such as a payment gateway, a point of sale system, or the like). The merchant payment authorization response message is generated by the transaction management system 108 after certain customer-related processing steps and transaction management system-related processing steps (described in our co-pending applications) have been completed, and after a payment account selected by the customer (using their mobile device 102) has been authorized for the purchase transaction. Processing continues at 214 where the point of transaction device 106 is operated to cause the generation of a transaction receipt to complete the transaction. The sequence of these messages is provided for illustrative purposes only. In some embodiments, the transaction processing may be performed in a different order—for example, a checkout token may be read by an NFC enabled mobile device 102 to initiate processing prior to any communication between the point of transaction 106 and the transaction management system 108.

As described in our co-pending applications, in some embodiments, the process of FIG. 2 may be modified to allow the merchant to transmit a merchant payment authorization request before the transaction total has been calculated. Further, in such embodiments, the customer may operate their NFC enabled mobile device 102 to read the checkout token before the transaction total has been calculated.

Figure 3:
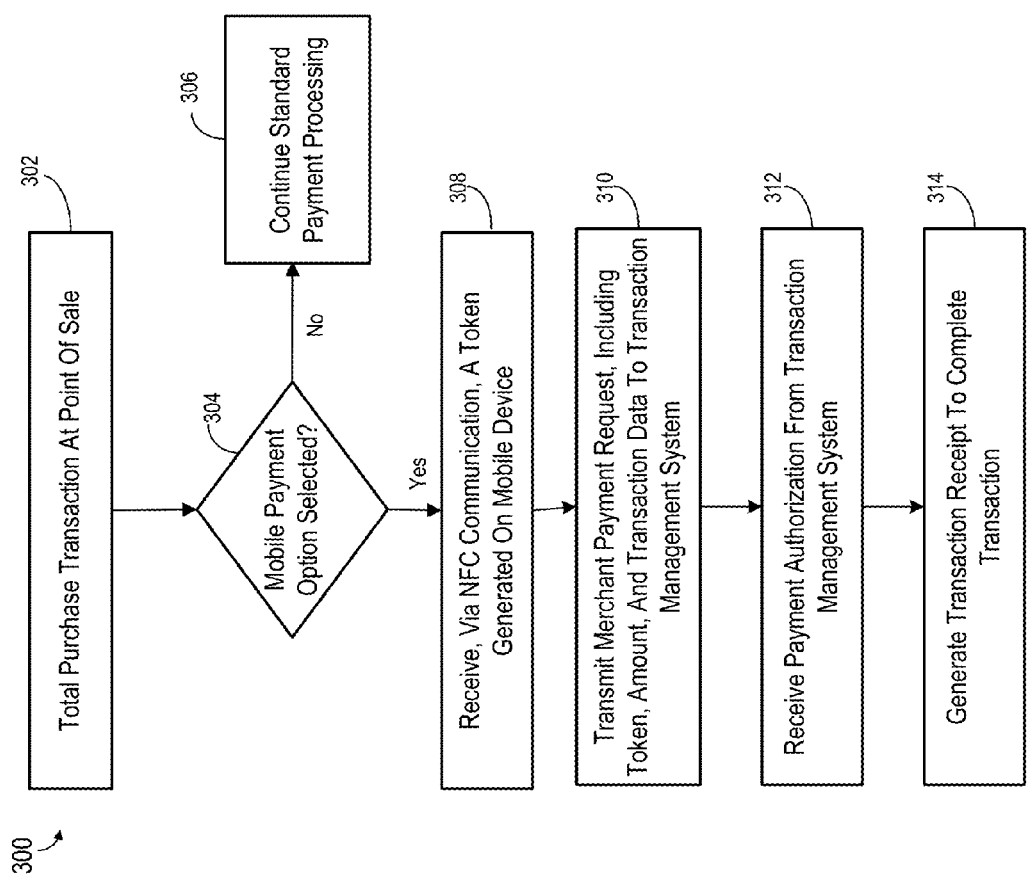
FIG. 3 is a flow diagram depicting a further process pursuant to some embodiments.

Pursuant to some embodiments, the NFC enabled mobile device 102 may be configured to write data to the NFC device 104 to deliver a checkout token or code to the point of transaction device 106. In such an embodiment, the NFC enabled mobile device 102 is configured to operate in an NFC writer mode, enabling the NFC enabled mobile device 102 to pass a checkout token or code to the point of transaction device 106. Certain existing payment schemes use the NFC capabilities of a mobile device to pass encrypted cardholder data to the payment terminal. Such schemes, as described in the background section above, require expensive and complex encryption and credentialing schemes to facilitate payments. Embodiments of the present invention, when operating in a mode as shown in FIG. 3, avoid such expense and complication, as the only information that is transmitted from the mobile device 102 to the point of transaction 106 is a static or dynamic checkout token used to associate the NFC enabled mobile device 102 to the point of transaction 106 such that a pending transaction involving the devices may be uniquely identified. In some embodiments, the checkout token is obtained by the NFC enabled mobile device 102 from the transaction management system 108 prior to (or during) the conduct of the transaction. In some embodiments, the checkout token may be obtained by the NFC enabled mobile device 102 prior to a transaction and cached for use. This allows a transaction pursuant to the present invention to be performed even in situations where the NFC enabled mobile device 102 is unable to reach the transaction management system 108 during a transaction (e.g., in situations where a transaction location has limited wireless or cellular connectivity available).

As shown in FIG. 3, a transaction in such an embodiment may proceed as follows. Processing begins at 302 where the goods or services are rung up to total the purchase. Processing continues at 304 where the point of transaction device 106 (or the clerk) prompts the customer to select a payment option, and a determination is made whether a mobile payment option is selected. If the mobile payment option is not selected, processing continues at 306 where standard payment processing or processing to complete the purchase using another payment option occurs.

Processing continues at 308 where the consumer selects an option on a mobile payment application on the NFC enabled mobile device 102 to generate (or otherwise obtain) a checkout token and to write the checkout token to the NFC device 104 associated with the point of transaction device 106. This checkout token is written from an NFC device on the NFC enabled mobile device 102 to the NFC device 104 via wireless communication (such as over a contactless communication interface 112 of FIG. 1). Once the checkout token is received by the NFC device 104, it is communicated (via interface 110 of FIG. 1) to the point of transaction device 106 for use in generating one or more messages to the transaction management system 108. For example, the point of transaction device 106 may, upon receipt of the checkout token, generate a merchant payment request message that includes transaction details (including, for example, a transaction amount, merchant information, point of transaction information, or the like). The transaction details, along with the checkout token, are transmitted to the transaction management system 108. Processing of the transaction continues in a similar fashion as described above in conjunction with FIG. 2 (and as described in our co-pending applications). In this manner, embodiments allow NFC enabled mobile devices 102 to conduct transactions in NFC writer mode, without need for complex, expensive and potentially insecure encryption schemes.

Whether the NFC enabled mobile device 102 operates in writer mode (as in FIG. 3) or in reader mode (as in FIG. 2), embodiments provide a number of advantages. For example, embodiments enable NFC based payment schemes for mobile devices and terminals that bypass card association, TSM, carrier and handset maker fees and rules by bypassing the need to use the secure element capabilities of the NFC controller chip. Further, embodiments allow all NFC enabled mobile devices that support reader/writer mode to have secure mobile payment and mobile offer redemption functionality without using card emulation NFC and a secure element. Embodiments also enable the completion of a contactless payment transaction in situations where there is no wireless connection available to the mobile device, without using card emulation mode NFC.

The above descriptions of processes herein should not be considered to imply a fixed order for performing the process steps. Rather, the process steps may be performed in any order that is practicable, including simultaneous performance of at least some steps.

Those skilled in the art, upon reading this disclosure, will appreciate that a wide number of different hardware and software configurations may be used to implement features of the present invention. As one specific illustrative (but not limiting) example, a point of transaction may be connected to a RC-S801 NFC Dynamic Tag (also referred to as a FeliCa Plug) offered by Sony. In some embodiments the RC-S801 NFC Dynamic Tag may be connected via a wired interface to receive a checkout token from an external system (such as a point of sale device or the like). Once received, the RC-S801 NFC Dynamic Tag may make the checkout token data present on an NFC tag in the RC-S801 and the checkout token data may be made available to be read by an NFC enabled mobile device 102 operating in NFC reader mode. The reverse process is also supported. That is, the RC-S801 NFC Dynamic Tag can be operated to receive a value (such as a checkout token) provided by an NFC enabled mobile device 102 operating in reader/writer mode. A number of other commercially available tags may be configured for use in conjunction with the system of the present invention.

In some embodiments, checkout tokens may be read (or written) using the NFC controller present in many NFC enabled mobile devices. For example, many mobile devices are equipped with NFC controllers such as the NXP PN532 which can read and write NFC tags. Such NFC controllers can also emulate standard NFC tags allowing them to serve as a point of transaction device 106. That is, an NFC enabled mobile device 102 configured in such a manner can be operated to present a checkout token to an NFC enabled mobile device 102 or to receive a checkout token from an NFC enabled mobile device 102 with NFC reader/writer mode capabilities.

It is also possible to make the solution work with the NFC controller present in many NFC phones are equipped with NFC controllers such as the NXP PN532 (available from NXP Semiconductors) which can read and write NFC tags. They can also emulate standard NFC tags, meaning that they can serve as a point of transaction device that can present a checkout token to an NFC enabled mobile device or receive a checkout token from an NFC enabled mobile device with NFC reader/writer mode capabilities. By allowing checkout tokens to be transmitted between such devices, transactions pursuant to the present invention may be performed.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A transaction management system, comprising:
 a non-transitory memory; and
 one or more hardware processors in communication with the non-transitory memory and configured to read machine-executable instructions from the non-transitory memory to cause the transaction management system to perform operations comprising:
   receiving, from of a mobile device associated with a user, a request for performing a mobile payment transaction with a merchant;
   in response to receiving the request, generating a first checkout token for the payment transaction based on an account of the user;
   transmitting the first checkout token to the mobile device;
   causing the mobile device to communicate the first checkout token to a point-of-sale (POS) device of the merchant by:
     configuring a first NFC device of the mobile device to operate in a writer mode;
     generating one or more NFC Data Exchange Format (NDEF) messages by encapsulating the first checkout token into the one or more NDEF messages,
     provisioning, via the first NFC device operating in the writer mode, the one or more NDEF messages to the NFC tag of the first NFC device, and
     causing the one or more NDEF messages to be written into a second NFC device associated with the POS device;
   receiving, from a merchant device associated with the merchant, a message comprising a second checkout token, a merchant identifier, and an amount;
   verifying that the second checkout token received from the merchant device corresponds to the first checkout token;
   in response to the verifying, processing the mobile payment transaction using a funding source associated with the account of the user based on the merchant identifier and the amount; and transmitting, to the mobile device, a merchant payment authorization response message indicating that the mobile payment transaction is processed.

2. The transaction management system of claim 1, wherein the one or more NDEF messages comprises a plurality of NDEF messages.

3. The transaction management system of claim 1, wherein the operations further comprise:
transmitting a receipt of the mobile payment transaction to the POS device.

4. The transaction management system of claim 1, wherein the first checkout token is a dynamic token generated specifically for the payment transaction.

5. The transaction management system of claim 4, wherein the first checkout token comprises at least one of information associated with the POS device, information associated with a date and a time of the payment transaction, or information associated with a transaction amount associated with the payment transaction.

6. The transaction management system of claim 1, wherein the operations further comprise creating a pending transaction in a merchant transaction queue.

7. The transaction management system of claim 6, wherein the pending transaction comprises the first checkout token, and wherein verifying that the second checkout token received from the merchant device corresponds to the first checkout token comprises looking up the pending transaction in the transaction queue.

8. The transaction management system of claim 1, wherein the operations further comprise receiving, from the mobile device, a selection of the funding source from a plurality of funding sources associated with the account of the user for use in the mobile payment transaction.

9. A method for conducting a payment transaction with a merchant, comprising:
receiving, by one or more hardware processors from a mobile device associated with a user, a request for performing a mobile payment transaction with a merchant;
in response to receiving the request, generating by the one or more hardware processors, a first checkout token for the mobile payment transaction based on an account of the user;
transmitting, by the one more hardware processors, the first checkout token to the mobile device;
causing the mobile device to communicate the first checkout token to a point-of-sale (POS) device of the merchant by:
generating one or more Near Field Communications (NFC) Data Exchange Format (NDEF) messages by encapsulating the first checkout token into the one or more NDEF messages,
operating a first NFC device of the mobile device in a writer mode,
provisioning, via the first NFC device operating in the writer mode, the one or more NDEF messages to a radio frequency identification (RFID) chip of the mobile device, and
causing the one or more NDEF messages to be written into a second NFC device associated with the POS device;
receiving, by the one or more hardware processors from a merchant device, a message comprising a second checkout token;
in response to verifying that the second checkout token corresponds to the first checkout token, processing, by the one or more hardware processors, the mobile payment transaction using a funding source associated with the account of the user; and
transmitting, by the one or more hardware processors to the mobile device, a merchant payment authorization response message indicating that the mobile payment transaction is processed.

10. The method of claim 9, wherein the first checkout token is generated further based on the mobile payment transaction.

11. The method of claim 9, wherein the first checkout token is a dynamic token generated specifically for the mobile payment transaction.

12. The method of claim 11, wherein the first checkout token comprises at least one of information associated with the POS device, information associated with a date and time of the mobile payment transaction, or information associated with a transaction amount associated with the mobile payment transaction.

13. A non-transitory machine readable medium having stored thereon machine-readable instructions executable to cause a machine associated with a transaction management system to perform operations comprising:
receiving, from a mobile device associated with a user, a request for performing a mobile payment transaction with a merchant;
in response to receiving the request, generating a first checkout token based on the mobile payment transaction;
transmitting the first checkout token to the mobile device;
causing the mobile device to communicate the first checkout token to a point-of-sale (POS) device of the merchant by:
generating one or more Near Field Communications (NFC) Data Exchange Format (NDEF) messages by encapsulating the first checkout token into the one or more NDEF messages,
configuring a first NFC device of the mobile device to operate in a writer mode,
provisioning, via the first NFC device operating in the writer mode, the one or more NDEF messages to a radio frequency identification (RFID) chip of the mobile device, and
causing the one or more NDEF messages to be written into a second NFC device associated with the POS device;
receiving, from a merchant device associated with the merchant, a message comprising a second checkout token;
verifying that the second checkout token received from the merchant device corresponds to the first checkout token;
in response to the verifying, processing the mobile payment transaction using a funding source associated with the user; and
receiving, from a transaction management system, transmitting, to the mobile device, a merchant payment authorization response message indicating that the mobile payment transaction is processed.

14. The non-transitory machine readable medium of claim 13, wherein the first checkout token is a dynamic token generated specifically for the mobile payment transaction.

15. The non-transitory machine readable medium of claim 14, wherein the first checkout token comprises at least one of information associated with the POS device, information associated with a date and a time of the payment transaction, or information associated with a transaction amount associated with the payment transaction.

16. The non-transitory machine readable medium of claim 13, wherein the one or more NDEF messages comprises a plurality of NDEF messages.

17. The non-transitory machine readable medium of claim 13, wherein the operations further comprise:
- transmitting a receipt of the mobile payment transaction to the POS device.

18. The non-transitory machine readable medium of claim 13, wherein the operations further comprise creating a pending transaction in a merchant transaction queue.

19. The non-transitory machine readable medium of claim 18, wherein the pending transaction comprises the first checkout token, and wherein verifying that the second checkout token received from the merchant device corresponds to the first checkout token comprises looking up the pending transaction in the transaction queue.

20. The non-transitory machine readable medium of claim 13, wherein the request comprises a merchant identifier associated with the merchant, and wherein the first checkout token is generated further based on the merchant identifier.

* * * * *